United States Patent
Imazu et al.

(10) Patent No.: US 7,422,717 B2
(45) Date of Patent: Sep. 9, 2008

(54) METHOD OF PRODUCING JOINT BOOT MADE OF RESIN

(75) Inventors: Eiichi Imazu, Osaka (JP); Hiroshi Ohno, Osaka (JP); Katsushi Saito, Osaka (JP)

(73) Assignee: Toyo Tire & Rubber Co., Ltd., Nishiku Osaka (JP)

( * ) Notice: Subject to any disclaimer, the term of this patent is extended or adjusted under 35 U.S.C. 154(b) by 763 days.

(21) Appl. No.: 10/792,144

(22) Filed: Mar. 3, 2004

(65) Prior Publication Data

US 2004/0188891 A1 Sep. 30, 2004

Related U.S. Application Data

(63) Continuation of application No. 10/357,169, filed on Jan. 31, 2003, now abandoned.

(30) Foreign Application Priority Data

| Apr. 8, 2002 | (JP) | ............................. 2002-105755 |
| May 14, 2002 | (JP) | ............................. 2002-139323 |

(51) Int. Cl.
*B29C 49/06* (2006.01)
*B29C 49/20* (2006.01)

(52) U.S. Cl. .................. 264/506; 264/513; 264/515; 264/516

(58) Field of Classification Search ................ 264/513, 264/515, 516
See application file for complete search history.

(56) References Cited

U.S. PATENT DOCUMENTS

| 3,688,523 | A | 9/1972 | Schafer |
| 4,559,025 | A * | 12/1985 | Dore ........................... 464/175 |
| 5,027,665 | A | 7/1991 | Hayward |
| 5,094,894 | A | 3/1992 | Schafferus et al. |
| 5,330,342 | A | 7/1994 | Linss et al. |
| 5,672,113 | A | 9/1997 | Tomogami et al. |
| 6,209,885 | B1 | 4/2001 | Mukaida et al. |
| 6,464,233 | B1 | 10/2002 | Oetiker |
| 6,695,706 | B2 * | 2/2004 | Furuta .......................... 464/175 |

FOREIGN PATENT DOCUMENTS

| EP | 1 293 692 A1 | 3/2003 |
| FR | 2622947 A3 | 5/1989 |
| JP | 2-221767 | 9/1990 |
| JP | 8-150656 | 6/1996 |
| JP | 409254239 A * | 9/1997 |
| JP | 2001-003950 | 1/2000 |

OTHER PUBLICATIONS

Hochgrebe M: "Automatisierung Von Blas-Und Spritzblasmachinen" Kunststoffberater, Kunststoff Verlag. Isernhagen, DE, vol. 39, No. 7/8, Jul. 1, 1994, pp. 14-19.

* cited by examiner

*Primary Examiner*—Suzanne E. McDowell
(74) *Attorney, Agent, or Firm*—Knobbe Martens Olson & Bear LLP (57) ABSTRACT

A joint boot which is made of resin comprising a small-diameter cylinder part, a large-diameter cylinder part and a bellows part interlinking both is molded by injection blow molding. While forming the bellows part by blow molding, the exterior boundary between an injection molding section and a blow molding section is set in a cutout portion formed in a shoulder portion of the recess for fixation.

2 Claims, 10 Drawing Sheets

BLOW MOLDING SECTION | INJECTION MOLDING SECTION

PRIOR ART

FIG. 10

PRIOR ART

FIG. 11

PRIOR ART

FIG. 12A

PRIOR ART

FIG. 12B

PRIOR ART

METHOD OF PRODUCING JOINT BOOT MADE OF RESIN

This is a continuation of U.S. application Ser. No. 10/357,169 filed Jan. 31, 2003 now abandoned, which claims priority to Japanese Patent Application No. 2002-105755 filed Apr. 8, 2002 and No. 2002-139323 filed May 14, 2002, the complete disclosure of which is incorporated herein by reference.

BACKGROUND OF THE INVENTION

1. Field of the Invention

This invention relates to a joint boot made of a resin, and more particularly to a bellows-like joint boot made of resin for use in a constant velocity joint for automotive vehicles or the like.

2. Description of the Related Art

A joint of a driving shaft for automotive vehicles or industrial machines is equipped with a joint boot in order to maintain the grease encapsulated therein or to prevent the dirt or the like from entering.

Figure 9:
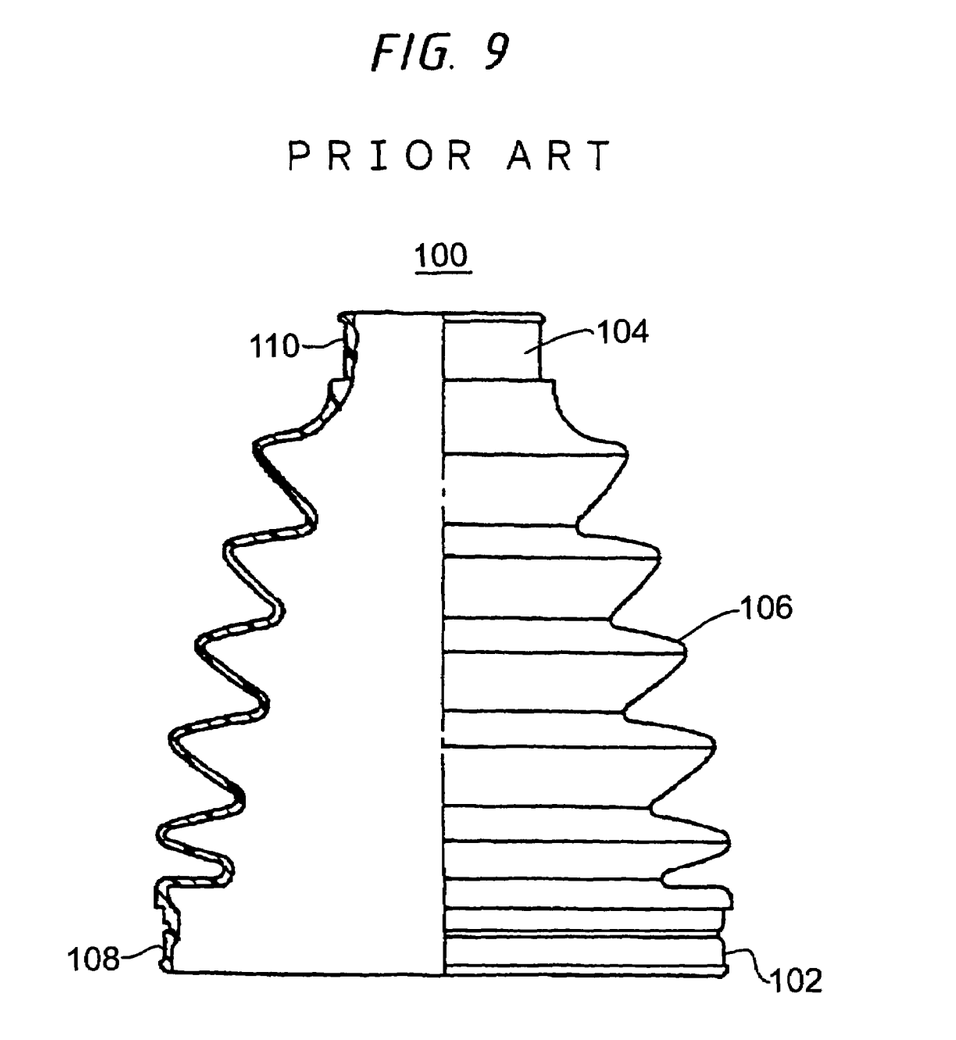
FIG. 9 is a half sectional, another half side elevational view of a conventional joint boot made of resin.
Figure 10:
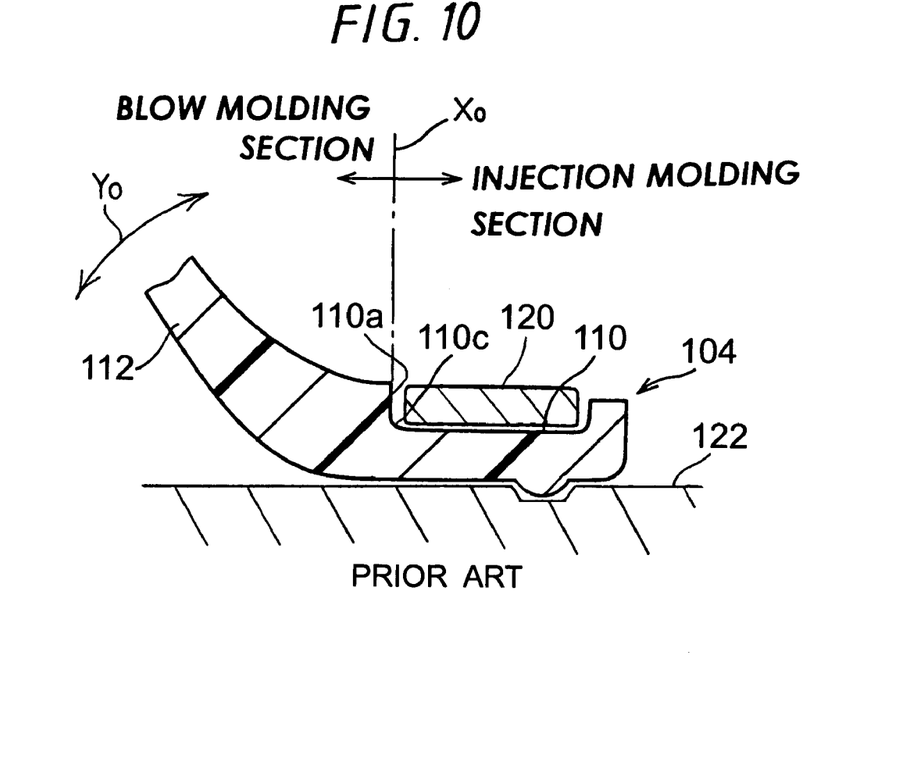
FIG. 10 is an enlarged sectional view of a small-diameter cylinder part of the conventional joint boot.

As illustrated in FIG. 9, a typical joint boot 100 is made up of a large-diameter cylinder part 102 to be fitted on a housing part of a constant velocity joint, a small-diameter cylinder part 104 disposed coaxially to be spaced apart from the large-diameter cylinder part 102 and adapted to be fitted to a shaft, and a bellows part 106 interlinking both parts. On outer circumferential surfaces of the large-diameter cylinder part 102 and the small-diameter cylinder part 104, there are provided respectively recesses 108, 110 for fixation for receiving therein respective fastening clamps. The small-diameter cylinder part 104 is, as shown in FIG. 10, fixed on an outer periphery of a shaft 122 with the aid of a ring-form fastening clamp 120 mounted on the recess 110 for fixation. The large-diameter cylinder part 102 is likewise fixed, although not shown, on an outer periphery of the housing part.

Figure 8A:
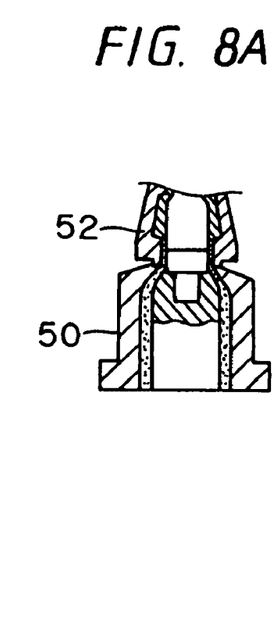
FIG. 8A to FIG. 8D are diagrammatic views showing respective steps of an injection blow molding process.
Figure 8B:
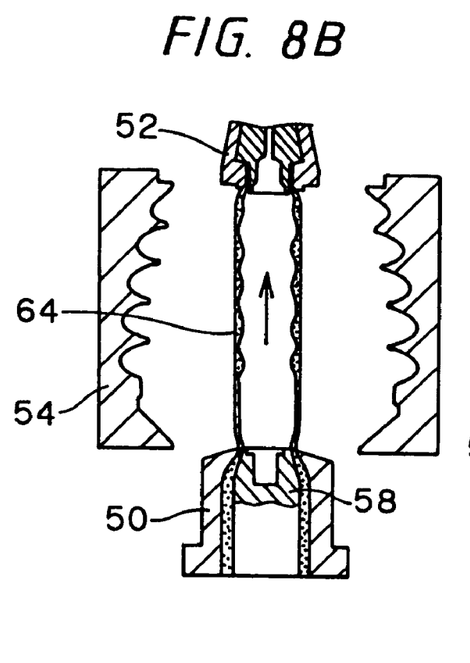
Figure 8C:
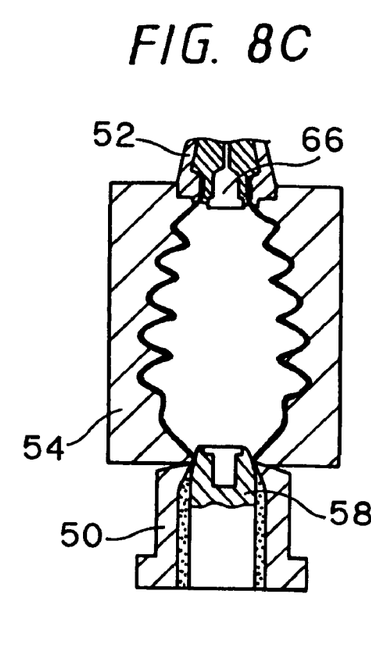
Figure 8D:
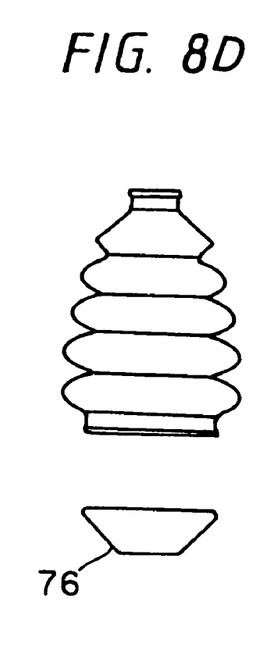
Figure 11:
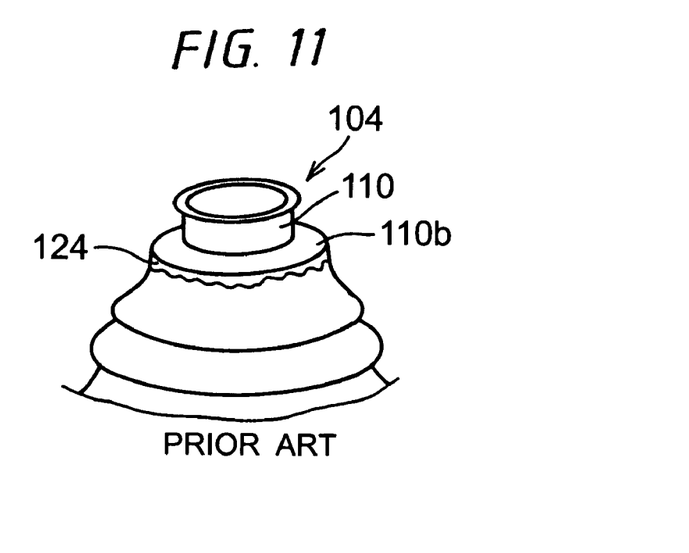
FIG. 11 is a partly enlarged, perspective view of the conventional joint boot.

The joint boot of this type can be molded by an injection blow molding procedure of a thermoplastic resin. In that case, an extrusion dye 50 and an injection mold 52 are matched as shown in FIG. 8A and a melted resin is injected from the extrusion dye 50 into the cavity of the injection mold 52. Then while moving the injection mold 52 upwardly, a parison 64 is drawn out as shown in FIG. 8B, and a blow mold 54 is closed to conduct a blow molding by admitting gas into the parison 64, as shown in FIG. 8C. By subsequent demolding and cutting out of a bottom section 76 as shown in FIG. 8D, the joint boot made of resin is thus molded.

Where a joint boot is molded by the injection blow molding procedure in this way, it is a conventional practice to set a boundary $X_0$ between the injection molding section and the blow molding section, as shown in FIG. 10, to be within the recess 110 for fixation, which is defined at the outer periphery of the small-diameter cylinder part 104, more particularly on a wall surface 110a on the bellows part side of the recess 110. The setting of the boundary $X_0$ within the recess 110 for fixation however runs into the problem that, as indicated in FIG. 11, a burr 124 is likely to be produced at a shoulder portion 110b on the bellows part side of the recess 110 for fixation.

Figure 12A:
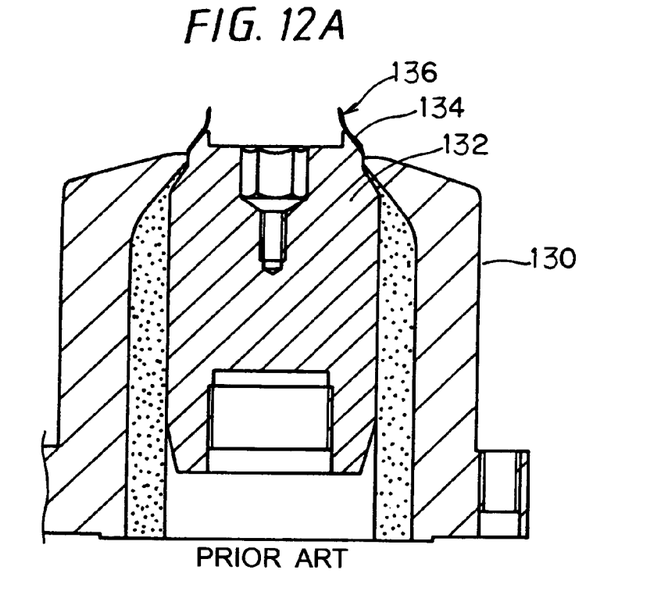
FIG. 12A and FIG. 12B are sectional views of the conventional joint boot when molded.
Figure 12B:
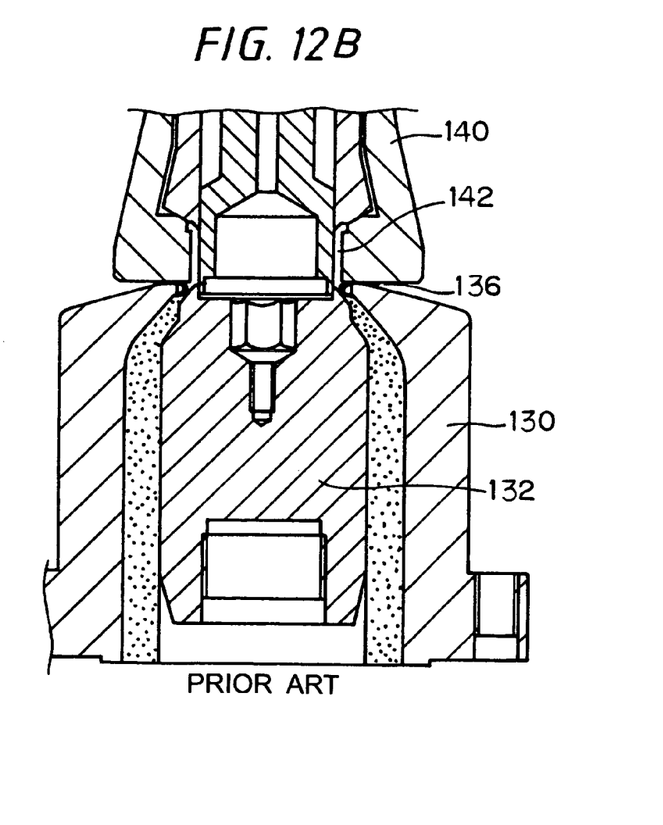

According to the present inventors, the production of the burr 124 has been turned out to be ascribed to the mechanism that will be described below: That is, when the extruder die and the molding product are separated from each other after blow molding, as shown in FIG. 12A, a melted resin 136 in a drawn state clings to a taper surface 134 at a top of a core 132 of the extruder die 130. When it proceeds to the next molding step in the state of the residual resin 136 clinging like this, in matching an injection mold 140 to the extruder die 130 as shown in FIG. 12B, the residual resin 136 catches on the outer peripheral edge of an opening of a cavity 142, thereby being extended radially outwardly and ultimately pinched between the extruder die 130 and the injection mold 140. As a consequence, the residual resin 136 remains on the molded product, as a result of which the burr is produced at the boundary between the injection molding section and the blow molding section.

On the other hand, a problem with the conventional resin joint boot of this kind is that since above all, the small-diameter cylinder part causes cracking at its recess for fixation when rotated in the state of a bending deformation at a wide angle, the joint boot is poor in durability. This is due to the fact that in particular, on the small-diameter cylinder part side, a first crest portion 112 of the bellows part 106 adjacent to the small-diameter cylinder part 104 is subjected to recurring deformation in the directions as indicated in an arrow $Y_0$ when rotated under bending deformation at a wide angle, as shown in FIG. 10 and consequently, a stress due to it acts on an extremity 110c of the recess 110 for fixation on the bellows part 106 side.

SUMMARY OF THE INVENTION

An object of this invention is to provide a joint boot made of resin capable of suppressing the production of a burr at a boundary between an injection molding section and a blow molding section.

Another object of this invention is to provide a joint boot made of resin having a good durability by suppressing the occurrence of cracking at the recess for fixation.

The present invention firstly provides a joint boot made of resin which is made up of a first cylinder part, a second cylinder part, and a bellows part integrally linking both and molded by injection blow molding procedure, the first cylinder part being of an injection molding section, wherein the first cylinder part is provided on its outer periphery with a recess for fixation, and a boundary, on an outer surface of the boot, between the injection molding section and a blow molding section is set on a bellows part side away from the recess for fixation.

According to the first joint boot made of resin, because of the fact that the boundary between the injection molding and the blow molding sections is thus set not within the recess for fixation, but at a position on the bellows part side, an outer peripheral edge of the cavity opening of an injection mold is made larger as compared with the case where the boundary is provided in the recess. Consequently, in matching the injection mold to an extruder die, the residual resin clinging to the core upon previous molding is accommodated within the cavity without being caught on the outer peripheral edge of the cavity opening, so that it is hard to be pinched between the injection mold and the extruder die. Stated another way, the residual resin clinging to the core is accommodated within a cavity space as a newly formed injection molding portion due to the fact that the boundary is displaced toward the bellows part side, and the next melted resin is injected, in this condition, into the cavity. On that account, the production of the burr at the boundary between the injection molding section and the blow molding section is restrained, whereby the rejection ratio upon molding can be significantly reduced.

In the aforementioned first joint boot made of resin, a shoulder portion of the recess for fixation on the bellows part side may be provided with a cutout portion, in which the boundary between the injection molding section and the blow molding section is set. Thereby it is possible to suppress the occurrence of cracking at the interface between the injection molding section and the blow molding section thereby enhancing the durability. In this case, the cutout portion may be comprised of a vertical area falling radially inwardly from an outer periphery of the first cylinder part and a slope area extending from an inward end of the vertical area to a wall surface of the recess for fixation. The slope area may be a curved plane.

In the first joint boot made of resin it is preferred that the first cylinder part be a small-diameter cylinder part and the second cylinder part be a large-diameter cylinder part coaxially disposed to the small-diameter cylinder part.

The present invention secondly provides a joint boot made of resin which is made up of a first cylinder part, a second cylinder part, and a bellows part interlinking both, wherein the first cylinder part is provided at its outer periphery with a recess for fixation, and a shoulder portion of the recess for fixation on the bellows part side is provided with a cutout portion.

With the second joint boot made of resin thus constructed, due to the fact that the shoulder portion of the recess for fixation on the bellows part side is cut out to provide the cutout portion, the volume of the shoulder portion is reduced, which can alleviate a stress imposed upon the extremity of the recess for fixation on the bellows part side. As a consequence, it is possible to enhance the durability of the joint boot made of resin. Since the problem of cracking ascribable to the stress is caused particularly on the small-diameter cylinder part side, it is further preferred that the first cylinder part be a small-diameter cylinder part and the second cylinder part be a large-diameter cylinder part coaxially arranged to the small-diameter cylinder part.

DETAILED DESCRIPTION OF THE PREFERRED EMBODIMENT

A joint boot 10 made of resin relating to one embodiment of this invention will be hereinafter described with reference to the drawings.

Figure 1:
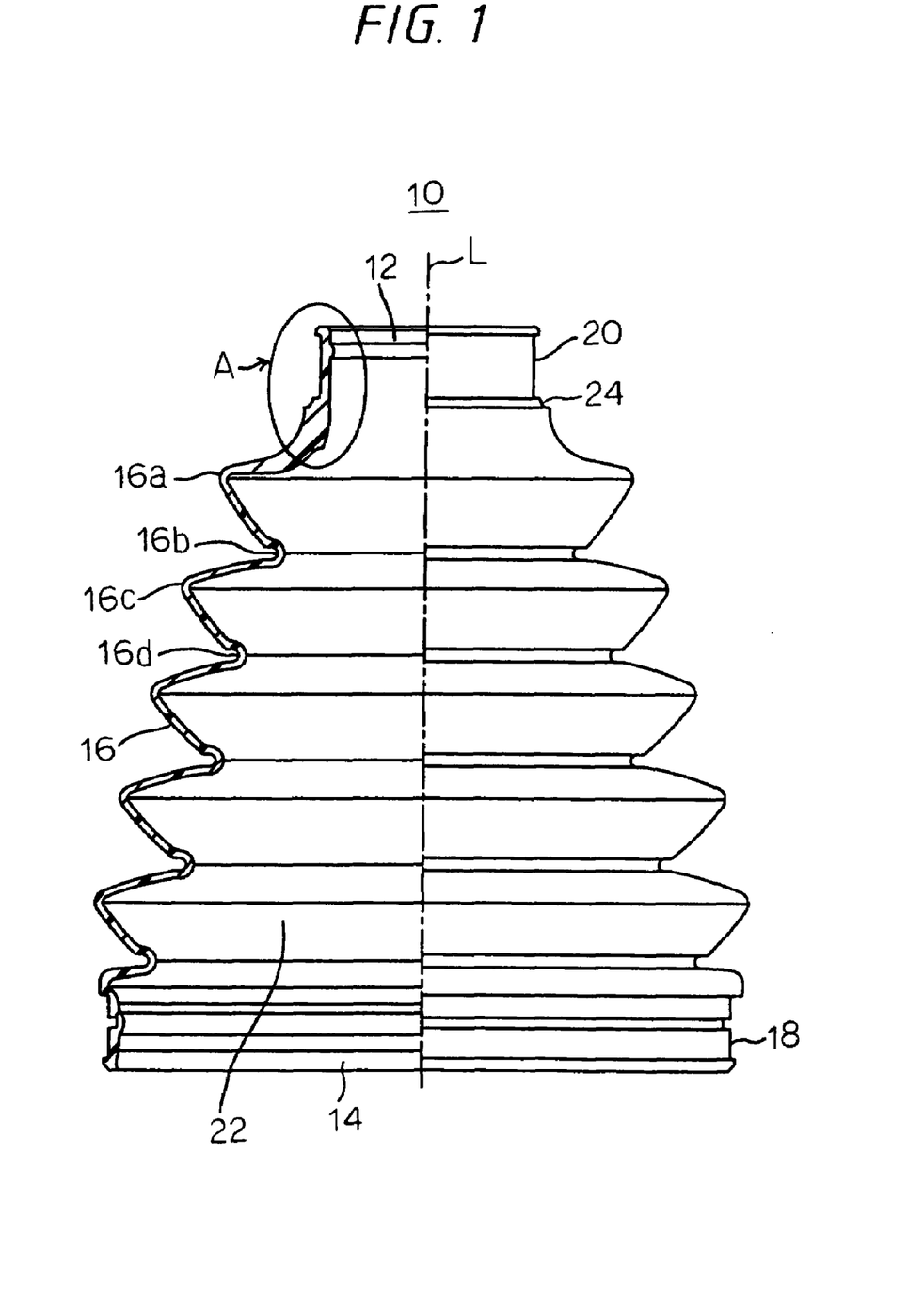
FIG. 1 is a half sectional, half side elevational view of a joint boot made of resin pertaining to one embodiment of this invention.
Figure 2:
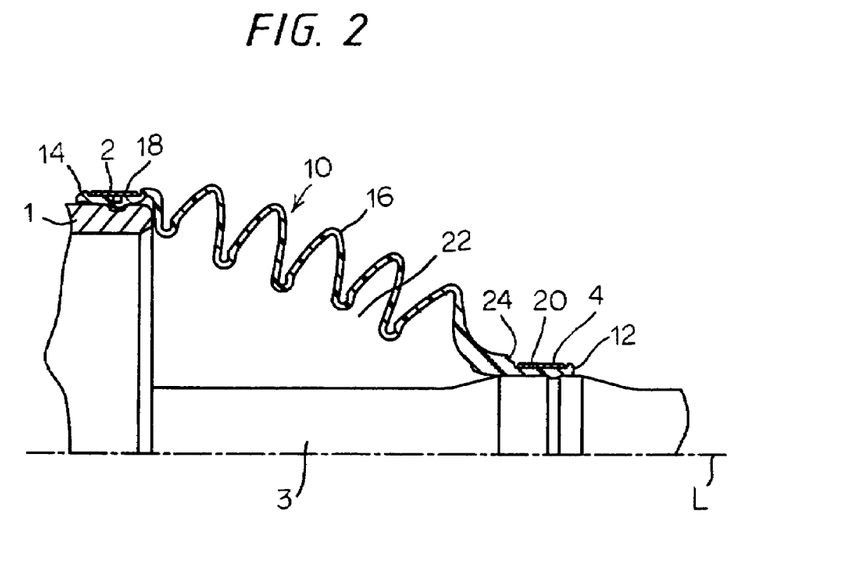
FIG. 2 is a half sectional view of the joint boot showing its installing state to a constant velocity joint.

The joint boot 10 made of resin in this embodiment is a boot made of a thermoplastic elastomer resin to be mounted on an automotive constant velocity joint, and comprises, as illustrated in FIGS. 1 and 2, a small-diameter cylinder part 12, a large-diameter cylinder part 14 coaxially disposed to be spaced apart from the small-diameter cylinder part 12, and a bellows part 16 integrally linking these small-diameter cylinder part 12 and large-diameter cylinder part 14.

The large-diameter cylinder part 14 assumes a short cylinder form so as to be externally fitted and secured to a top end of a cylindrical housing part 1 of a constant velocity joint on its outer periphery by means of a fastening clamp 2, and is provided on its outer periphery with a recess 18 for fixation for receiving the fastening clamp 2 which is ring-like, the recess for fixation extending circumferentially.

The small-diameter cylinder part 12 assumes a short cylinder form adapted to be fitted externally and secured to an outer periphery of a shaft 3 protruding from the housing part 1 by means of a fastening clamp 4 and is disposed coaxially, namely so as to have a common center line L to the large-diameter cylinder part 14. A recess 20 for fixation extending circumferentially for receiving the ring-like fastening clamp 4 is also defined on an outer periphery of the small-diameter cylinder part 12.

The bellows part 16 is of a cylindrical bellows body in cross-section with an aperture difference between both ends, which body internally forms a space 22 for encapsulating grease. The bellows part 16 comprises a plurality of alternately continuing crest portions and root portions, for example, a first crest portion 16a, a first root portion 16b, a second crest portion 16c, a second root portion 16d, and so on, in turn from the small-diameter cylinder part 12 side. The diameters of the crest portions and the root portions are set respectively to be progressively larger from the small-diameter cylinder part 12 to the large-diameter cylinder part 14.

Figure 3:
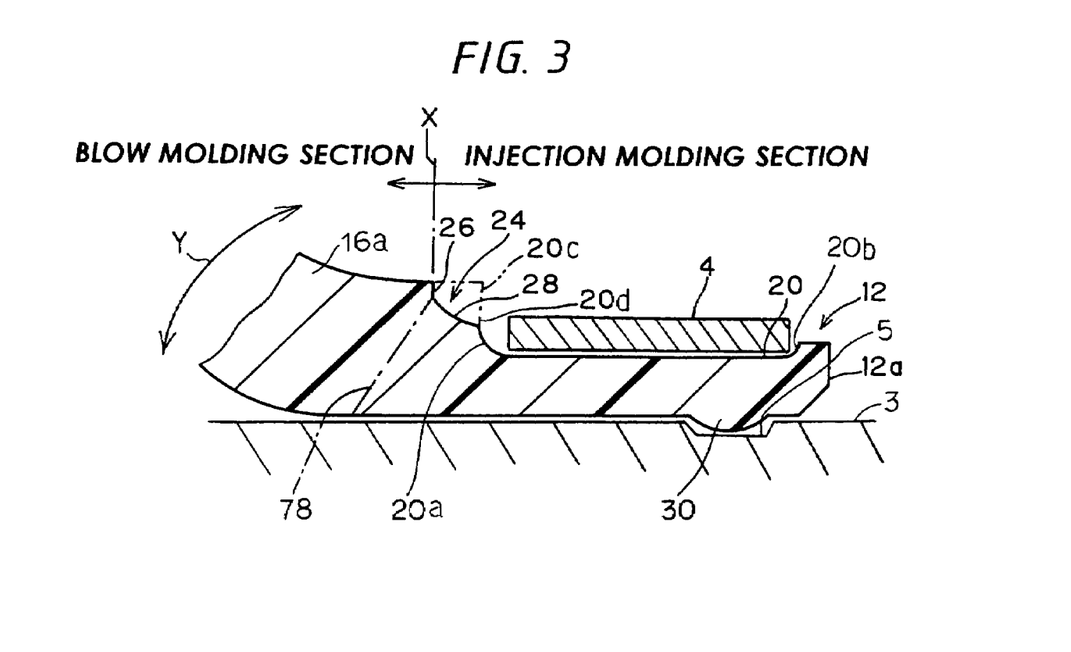
FIG. 3 is an enlarged view of a circumscribing part A in FIG. 1.

As illustrated in FIG. 3, the sectional configuration (sectional configuration passing through the center line L of the boot) of the small-diameter cylinder part 12 is such that both corner portions 20a, 20b on axially both sides of the recess 20 for fixation are formed as a curved plane. Further an upper part from the corner portion 20a of the recess 20 for fixation on the bellows part side, viz. a shoulder portion 20c on the bellows part side which stands up radially outwardly is cut out over a whole circumference, whereby a cutout portion 24 extending circumferentially is defined at the shoulder portion 20a.

The cutout portion 24 includes a vertical area 26 falling radially inwardly from an outer periphery of the small-diameter cylinder part 12 and a slope area 28 extending from an inward end of the vertical area 26 to a wall surface 20d of the recess 20 for fixation on the bellows part side. The slope area 28 is inclined radially inwardly from a lower end of the vertical area 26, viz. a radially inner end toward an opening edge 12a of the small-diameter cylinder part 12. The slope area in the illustrated embodiment is formed, in the sectional configuration above, as a curved surface convex toward the inside of the boot.

In this embodiment, the cutout portion 24 is thus provided with the vertical area 26, but it is also possible to cut out simply a taper area or curved area extending from the outer periphery of the small-diameter cylinder part 12 to the wall surface 20d of the recess 20 for fixation on the bellows part side without providing the vertical area like this thereby providing the cutout portion 24.

The small-diameter cylinder part 12 is further provided, on its inner periphery, with a projecting streak 30 for sealing, which projects radially inwardly as indicated in FIG. 3. The projecting streak 30 for sealing is provided at a back side of the recess 20 for fixation and constructed so that the projecting streak in its fitting state in a recess 5 provided on an outer periphery of the shaft 3 may be secured by means of the fastening clamp 4 thus ensuring a sealing property of a space 22 for encapsulation of grease on the small-diameter cylinder part 12 side.

The joint boot 10 is molded by injection blow molding, the small-diameter cylinder part 12 side being made into an injection molding section, wherein a boundary between the injection molding section and a blow molding section, namely a boundary X on an outer surface of the boot between the injection molding section and the blow molding section is set, as shown in FIG. 3, not within the recess 20 for fixation, but rather within the small-diameter cylinder part 12 on the bellows part 16 side. In this embodiment, boundary X between the injection molding section and the blow molding section is set within the cutout portion 24, more particularly so as to conform to the vertical area 26 of the cutout portion 24. As illustrated in FIG. 3, an interface 78 between the injection molding section and the blow molding section is formed, in a thickness direction of the small-diameter cylinder part 12, in the state that the more inboard side of the boot from the aforesaid boundary X is more inclined toward the bellows part side.

A molding assembly used for injection blow molding of the joint boot 10 in this embodiment is, as illustrated in FIGS. 8A to 8C, provided with an extruder die 50 fitted at its top surface with an orifice capable of discharging a melted resin in a cylindrical form, an injection mold 52 capable of advancing or receding axially relative to the top surface of the extruder die 50, and a blow mold 54 disposed between the extruder die 50 and the injection mold 52.

Figure 4:
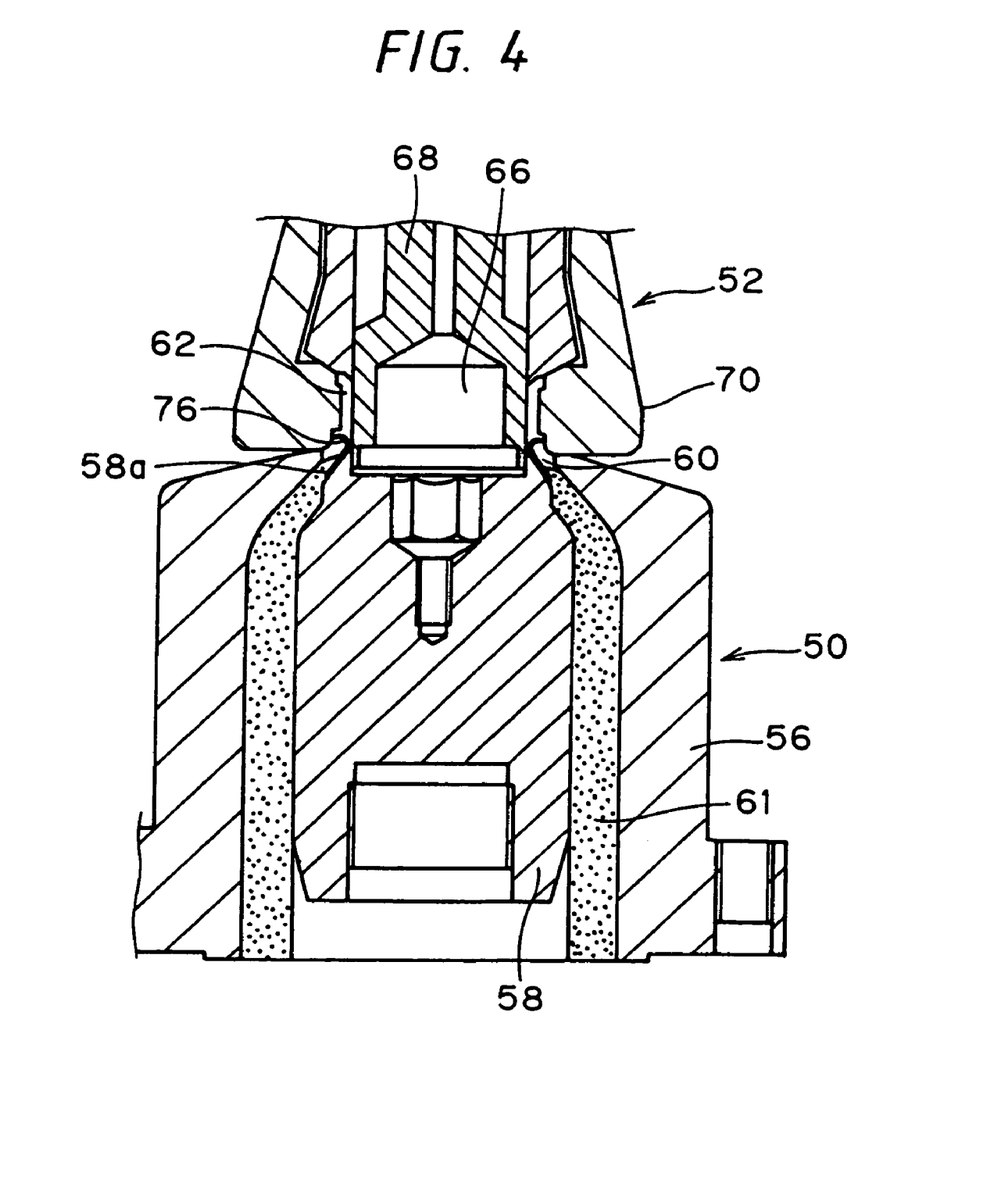
FIG. 4 is a sectional view of the joint boot when injection molded.

The extruder die 50 as shown in FIG. 4 is equipped with a die body 56 and a core 58 axially movable within it. The top surface of the extruder die 50, viz. the upside is formed by the orifice 60 assuming an annular form between the die body 56 and the core 58 so that the orifice 60 can be opened or closed and its delivery amount can be adjusted by a vertical movement of the core 58, as illustrated in FIGS. 5 and 6.

The injection mold 52 is a mold having a cavity 62 where to mold the small-diameter cylinder part 12 of the joint boot 10, and is provided with an inner mold 68 having an air supply portion 66 for feeding air into a parison 64 and an outer mold 70 surrounding the inner mold 68, thus forming the cavity 62 between the inner mold 68 and the outer mold 70. The cavity 62 opens at a top surface of the injection mold 52, namely at the underside so that this opening part can be superposed on the orifice 60 of the extruder die 50, whereby the melted resin 61 discharged from the orifice 60 can be injected into the cavity 62. The injection mold 52 also acts as a drawing member for drawing the parison 64, which is a cylindrical melted resin discharged out of the extruder die 50, out upwardly.

The blow mold 54 is a lateral splitting type of mold for blow molding the bellows part 16 and the large-diameter cylinder part 14 of the joint boot 10 from the parison 64.

Figure 5:
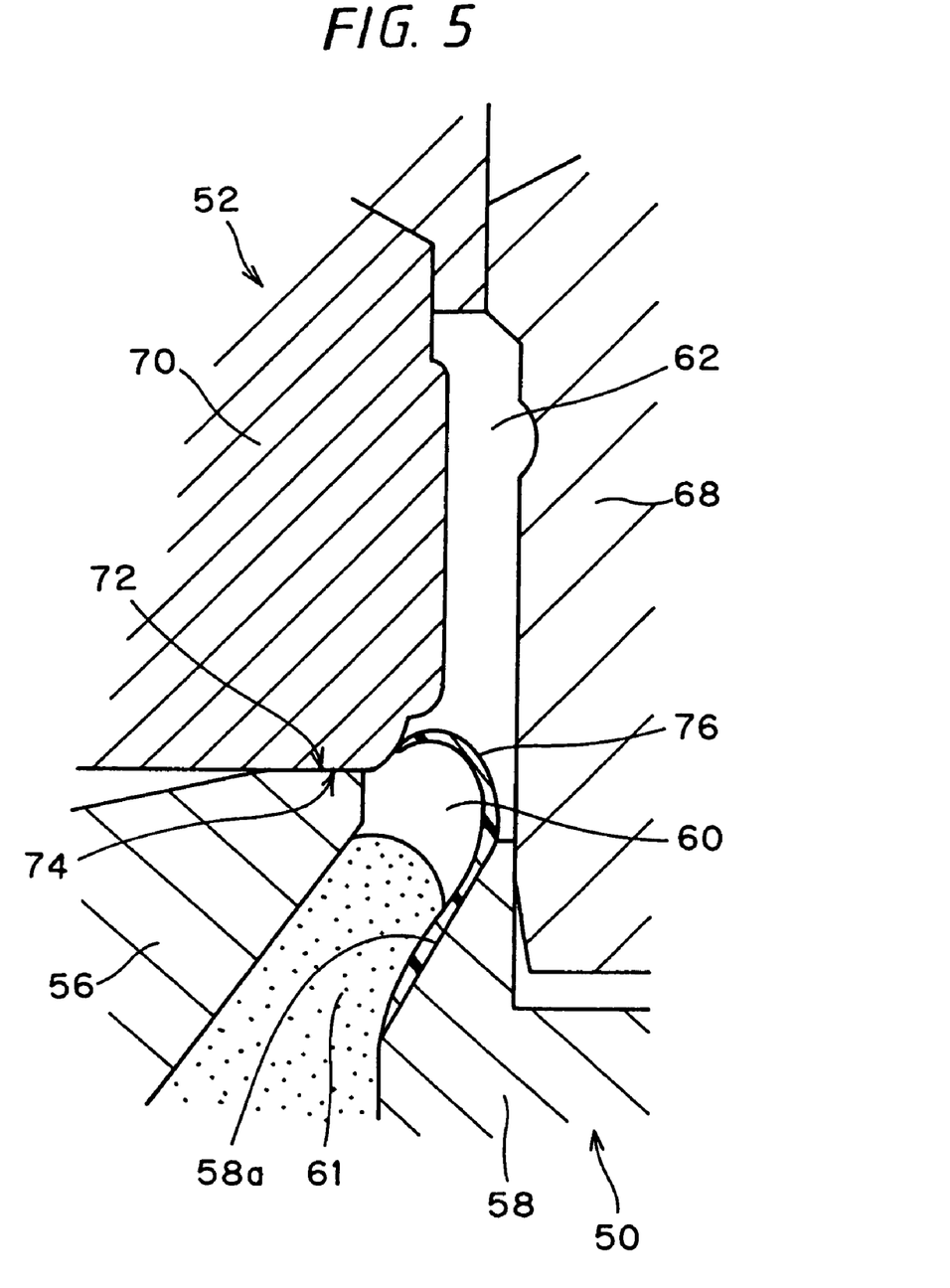
FIG. 5 is an enlarged sectional view of a main part of FIG. 4.
Figure 6:
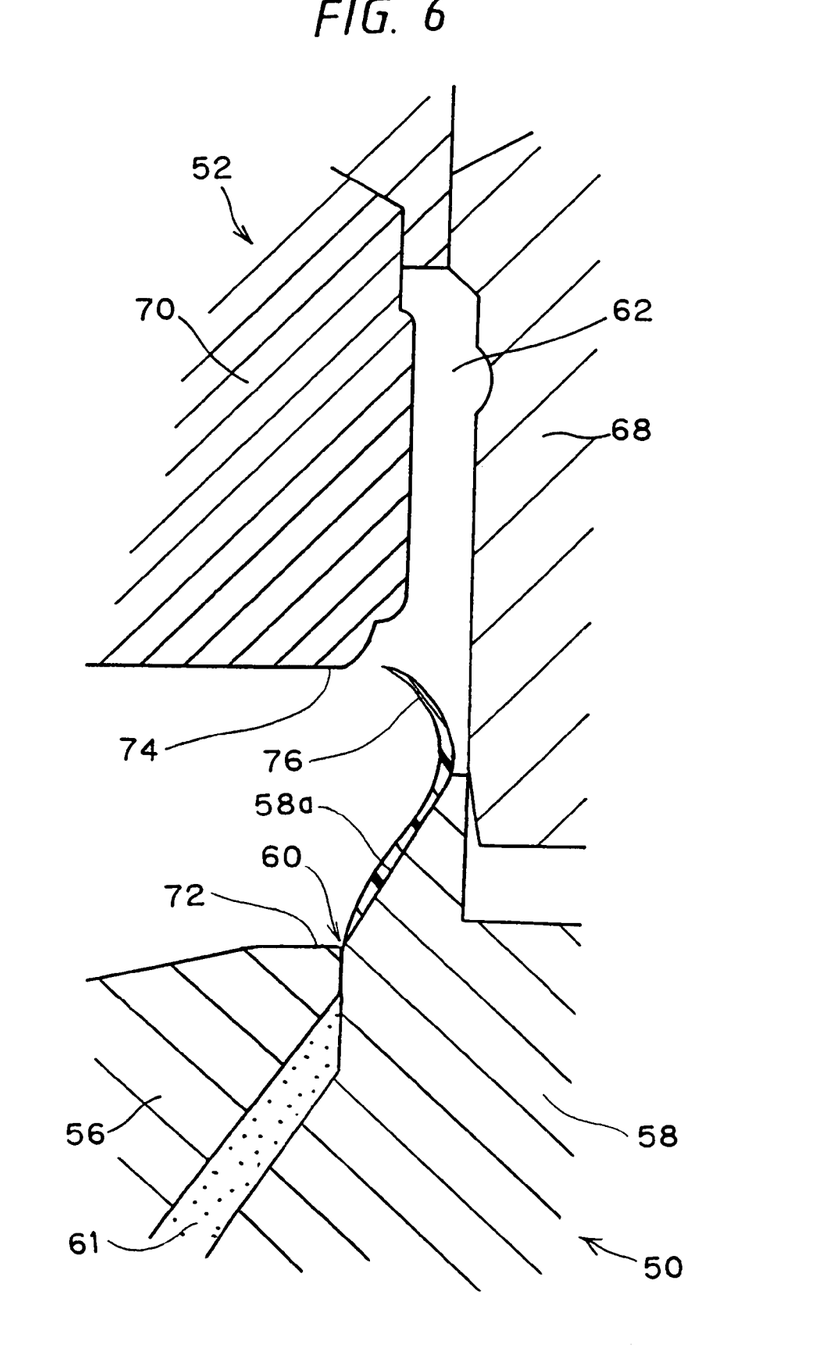
FIG. 6 is a sectional view showing a previous state to the state of FIG. 5.

As indicated in FIG. 5, the injection mold 52 in this embodiment has the cavity 62 for molding the small-diameter cylinder part 12 including the cutout portion 24. More specifically, the opening surface of the cavity 62 is set so as to be located at the vertical area 26 of the cutout portion 24.

In conducting an injection blow molding by use of this molding assembly, first, as shown in FIG. 8A, the injection mold 52 is matched with the top surface of the extruder die 50 to inject the melted resin from the extruder die 50 into the cavity of the injection mold 52. At that time, by combining the extruder die 50 and the injection mold 52 together as shown in FIGS. 4 to 6, the core 58 of the extruder die 50 is moved downwardly thereby to open the orifice 60 at the top surface and the melted resin 61 is injected into the cavity 62. Further, at that time, an outer peripheral edge 72 of the orifice 60 of the extruder die 50 abuts on an outer peripheral edge 74 of the opening of the cavity 62 of the injection mold 52 as illustrated in FIG. 5 and FIG. 6, whereby a leakage of the melted resin 61 outside is precluded.

After injection molding, the injection mold 52 is moved axially, namely upwardly while adjusting the delivery amount of the melted resin by moving the core 58 of the extruder die 50 up and down as shown in FIG. 8B to draw the parison 64 out.

The parison 64 is thus drawn out in a predetermined length, and then, the injection mold 52 is stopped, simultaneously with which the core 58 of the extruder die 50 is moved upwardly to close the orifice 60 at the top surface. The blow mold 54 is set between the extruder die 50 and the injection mold 52 and closed, as shown in FIG. 8C, and air is admitted from the air supply portion 66 of the injection mold 52 into the parison 64 to conduct blow molding.

After blow molding, as shown in FIG. 8D, the resulting molding product is demolded and its bottom section 76 is cut off thereby to yield the joint boot made of resin.

In accordance with this embodiment, because the boundary X of the injection molding section and the blow molding section is set not within the recess 20 for fixation of the small-diameter cylinder part 12, but rather on the bellows part 16 side, the diameter of the outer peripheral edge 74 at the opening of the cavity 62 at the top surface of the injection mold 52 is nearly the same as the diameter of the outer peripheral edge 72 of the orifice 60 of the extruder die 50, and accordingly, formed larger than in the conventional case. Consequently, even if the residual resin 76 clings to the tapered surface 58a at the top edge of the core 58 of the extruder die 50 as illustrated in FIG. 6, in mating the injection mold 52 with the extruder die 50, the outer peripheral edge 74 at the top surface of the die is difficult to catch the residual resin 76. Because of that, the residual resin 76 clinging to the core 58 at its top edge, as shown in FIGS. 4 and 5, is accommodated in the space inside the cutout portion 24 in the cavity 62 of the injection mold 52, with the result that it is not likely for the residual resin 76 to be pinched between the extruder die 50 and the injection mold 52. The production of any burr at the boundary X of the injection molding section and the blow molding section is therefore suppressed. The residual resin 76 is integrated by the melted resin 61 subsequently injected in the cavity 62 to form the small-diameter cylinder part 12.

Figure 7:
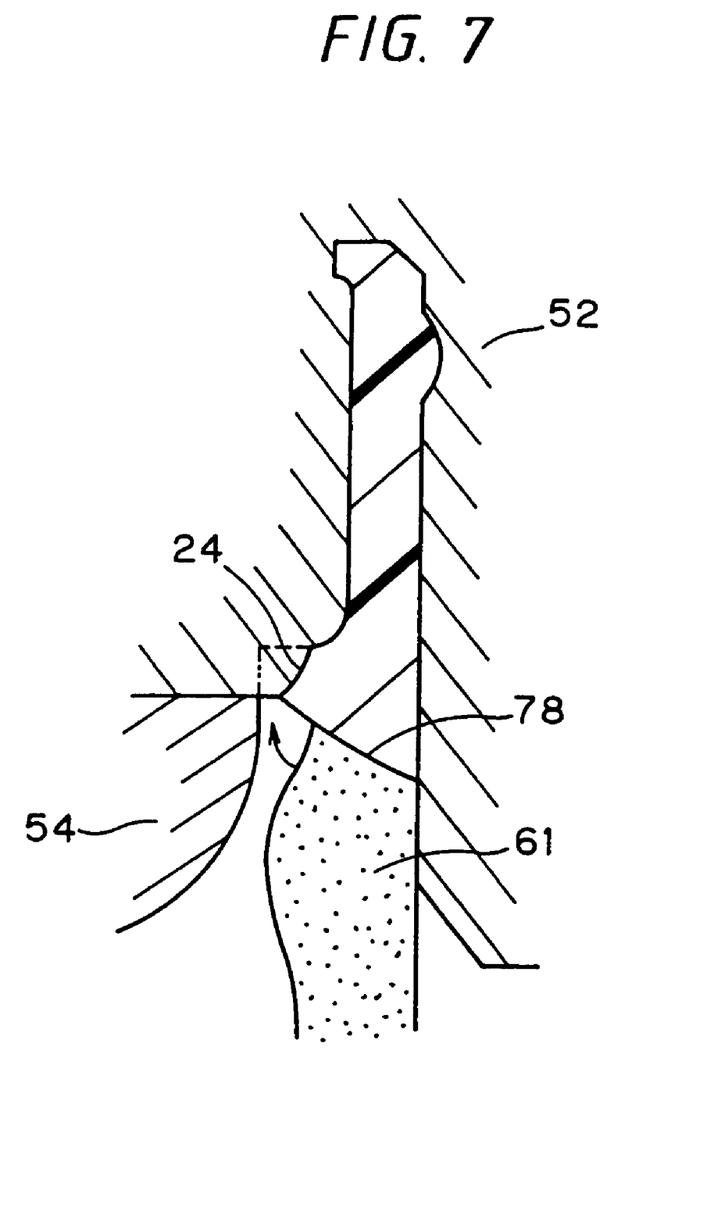
FIG. 7 is an enlarged sectional view of a main part of the joint boot when blow molded.

Further in this embodiment, due to the fact that the cutout portion 24 is provided in the recess 20 for fixation and the boundary X of the injection molding section and the blow molding section is set in the cutout portion 24, the length of the interface 78 between the injection molding section and the blow molding section, in the sectional configuration passing through the center line L as shown in FIG. 3, is made shorter on the external surface side of the boot by a magnitude corresponding to the depth of the cutout portion 24 as compared with the case where the cutout portion 24 is not formed. Consequently, in blow molding when the uncured melted resin 61 is cured by blowing of air, while moving along the aforementioned interface 78 outwardly, to be united to the injection molding section as shown in FIG. 7, it is possible to make the moving distance shorter. The interface 78 on the external surface side of the boot is united more slowly than on the internal surface side, so that it is liable to be lower in adhesiveness. However in this embodiment, because the interface 78 on the external surface side is shortened by the cutout portion 24, it is possible to suppress a bad adhesion of the injection molding section to the blow molding section to restrain the occurrence of cracking from the external surface side of the boot, thereby enhancing the durability.

Again according to this embodiment, due to the fact that the shoulder portion 20c on the bellows part side of the recess 20 for fixation is cut out to provide the cutout portion 24, the volume of the shoulder portion 20c is reduced. Therefore even in cases where repeated deformation is imparted on the first crest portion 16a of the bellows part 16 in the directions of an arrow Y, a stress imposed on the corner portion 20a of the recess 20 for fixation on the bellows part side is relaxed. As a consequence, even if rotated in the bending deformation state at a wide angle as illustrated in FIG. 3, the joint boot 10 is hard to cause cracking in the recess 20 for fixation at the small-diameter cylinder part 12, and accordingly, has a superior durability.

With a view toward corroborating such a durability effect, a simulation was conducted on the joint boot in this embodiment shown in FIG. 1 and the conventional joint boot illustrated in FIG. 9 regarding stress distributions under conditions of deformation at joint angles (an angle made by the center line of the housing part and the center line of the shaft) of 43 degrees and 35 degrees by using analysis based on finite element method (hereinafter referred to as "FEM analysis").

The results obtained are given in Table 1 below. In the present embodiment wherein the recess for fixation of the small-diameter cylinder part has the cutout portion at the shoulder portion on the bellows part side, vibrational amplitude values of a maximum stress imposed on the edge on the bellows part side of the recess (vibrational amplitudes of a main stress acting in the direction along a cross-section R of the edge on the bellows part side) were diminished as compared with those of the conventional example devoid of the cutout portion.

Furthermore, the joint boot in the embodiment shown in FIG. 1 and the conventional joint boot shown in FIG. 9 were molded by use of a thermoplastic elastomer as a boot molding material, and both joint boots made of resin thus obtained were subjected to durability test. The durability test was performed with the joint boots made of resin incorporated at a joint angle in a constant velocity joint, at ambient temperature of 100 43 degrees and at a revolution number of 500 rpm.

The results obtained are given in Table 1 below. With the conventional joint boot, a breakage occurred from the corner portion, on the bellows part side, of the recess for fixation of the small-diameter cylinder part in 25 hours after starting of the test. In contrast, with the joint boot in the embodiment, the occurrence of breakage elongated up to 40 hours after starting of the test. Thus the targeted value of 30 hours can be achieved and the breakage was seen in a root portion of the bellows part, with no breakage at the small-diameter cylinder part.

TABLE 1

| | | Joint Boot in the Embodiment | Conventional Joint Boot |
|---|---|---|---|
| Sectional Configuration | | FIG. 1 (with cutout portion) | FIG. 8 (without cutout portion) |
| FEM Analysis Results (kg/mm$^2$) | Joint angle = 43° | 1.9 | 2.4 |
| | Joint angle = 35° | 1.4 | 1.6 |
| Durability Test | Time taken until breakage | 40 hours | 25 hours |
| | Place of Breakage | Bellows part | Small-diameter cylinder part |
| | Achievement of Target 30 hr. | Acceptance | Rejection |

In the foregoing embodiment, one example was thus described wherein the cutout portion 24 is provided in the recess 20 for fixation of the small-diameter cylinder part 12 on the bellows part side 20c, but it is also possible to provide a similar-cutout portion in the recess 18 for fixation of the large-diameter cylinder part 14, or similar cutout portions in both the recesses 18, 20 for fixation of the small-diameter and the large-diameter cylinder parts 12, 14, instead.

What is claimed is:

1. A method for manufacturing a joint boot made of resin comprising a first cylinder part provided at its outer periphery with a recess for fixation, a second cylinder part, and a bellows part integrally linking the first cylinder part and the second cylinder part, said method comprising:

forming the first cylinder part by injection molding using a mold shaped to form the recess and a shoulder portion connecting the recess and the bellows part, wherein a portion of the mold for forming the shoulder portion is shaped to form a cutout area in the shoulder portion; and forming the bellows part and the second cylinder part by blow molding, wherein an exterior boundary between the a section formed by the injection molding and a section formed by the blow molding is placed in the cutout area, wherein the cutout area comprises a wall surface perpendicular to an axis of the joint boot, and a slope extending from the wall surface to a wall surface of the recess of the first cylinder part, wherein the wall surface is a part of the section formed by the blow molding and the slope is a part of the section formed by the injection molding.

2. The method as set forth in claim 1, wherein the slope is of a curved surface.

* * * * *